(12) United States Patent
Xiang

(10) Patent No.: US 10,106,404 B2
(45) Date of Patent: Oct. 23, 2018

(54) RESIDUAL GAS HEAT EXCHANGE COMBUSTION-SUPPORTING SYSTEM BASED ON METHANOL-WATER MIXTURE REFORMING HYDROGEN PRODUCTION SYSTEM, AND METHOD THEREOF

(71) Applicant: GUANGDONG HYDROGEN ENERGY SCIENCE AND TECHNOLOGY CO., LTD, Dongguan (CN)

(72) Inventor: Hua Xiang, Dongguan (CN)

(*) Notice: Subject to any disclaimer, the term of this patent is extended or adjusted under 35 U.S.C. 154(b) by 0 days.

(21) Appl. No.: 15/444,329

(22) Filed: Feb. 28, 2017

(65) Prior Publication Data

US 2017/0183226 A1 Jun. 29, 2017

Related U.S. Application Data

(63) Continuation of application No. PCT/CN2016/083485, filed on May 26, 2016.

(30) Foreign Application Priority Data

Jun. 5, 2015 (CN) .......................... 2015 1 0300749

(51) Int. Cl.
 *C01B 3/32* (2006.01)
 *C01B 3/50* (2006.01)
 (Continued)

(52) U.S. Cl.
 CPC ............ *C01B 3/323* (2013.01); *B01D 53/228* (2013.01); *B01D 53/265* (2013.01);
 (Continued)

(58) Field of Classification Search
 CPC ...... C01B 2203/043; C01B 2203/1229; C01B 2203/0244; C01B 2203/0288;
 (Continued)

(56) References Cited

U.S. PATENT DOCUMENTS 8,961,627 B2 2/2015 Edlund
2006/0137246 A1* 6/2006 Kumar .................. B01J 8/0257
 48/61

(Continued)

FOREIGN PATENT DOCUMENTS

CN 103387210 A 11/2013
CN 103569964 A 2/2014
(Continued)

*Primary Examiner* — Amber R Orlando
*Assistant Examiner* — Syed T Iqbal
(74) *Attorney, Agent, or Firm* — Wayne & Ken, LLC; Tony Hom

(57) ABSTRACT

The invention discloses residual gas heat exchange combustion-supporting system based on a methanol-water mixture reforming hydrogen production system and a method thereof, wherein the residual gas heat exchange combustion-supporting system comprises a reformer, a heat exchange tube and an air intake device; the reformer is provided with a reforming chamber, a separating device, a combustion chamber and an exhaust vent, the residual gas produced by the reformer is discharged from the exhaust vent to the first delivery passage of the heat exchange tube; the heat exchange tube has coaxial double-layer first and second delivery passages. The invention enables to fully reclaim the heat from the residual gas discharged by the reformer, so that the outside air is warmed before entering the reformer, which in turn makes the warmed outside air attain a very good combustion-supporting effect.

15 Claims, 4 Drawing Sheets

(51) Int. Cl.
  *B01D 53/22* (2006.01)
  *B01D 53/26* (2006.01)
  *B01D 61/02* (2006.01)
  *B01D 71/02* (2006.01)
  *B01J 19/00* (2006.01)
  *C01B 3/16* (2006.01)
  *C01B 3/22* (2006.01)
  *C02F 1/44* (2006.01)

(52) U.S. Cl.
  CPC ......... *B01D 61/025* (2013.01); *B01D 71/022* (2013.01); *B01J 19/0013* (2013.01); *C01B 3/16* (2013.01); *C01B 3/22* (2013.01); *C01B 3/32* (2013.01); *C01B 3/50* (2013.01); *C01B 3/505* (2013.01); *C02F 1/441* (2013.01); *B01D 2256/16* (2013.01); *B01D 2257/504* (2013.01); *B01J 2219/00092* (2013.01); *C01B 2203/0233* (2013.01); *C01B 2203/0277* (2013.01); *C01B 2203/0283* (2013.01); *C01B 2203/041* (2013.01); *C01B 2203/0822* (2013.01); *C01B 2203/0883* (2013.01); *C01B 2203/1223* (2013.01); *Y02C 10/10* (2013.01)

(58) Field of Classification Search
  CPC ........ C01B 2203/1235; C01B 2203/84; C01B 2203/046; C01B 2203/0283; C01B 2203/1223; C01B 2203/0838; C01B 2203/0475; C01B 2203/0405; C01B 2203/143; C01B 2203/0233; C01B 3/386; C01B 3/382; C01B 2203/0415; C01B 2203/0261; C01B 2203/04; C01B 2203/0827; C01B 2203/82; C01B 3/16; C01B 3/22; C01B 3/32; C01B 3/323; C01B 3/50; C01B 3/505; C01B 2203/0277; C01B 2203/041; C01B 2203/0822; C01B 2203/0883; B01J 8/0465; B01J 8/048; B01J 2208/00309; B01J 2208/00504; B01J 2208/00362; B01J 2208/00203; B01J 8/0442; B01J 8/0257; B01J 8/067; B01J 2208/00849; B01J 2208/025; B01J 8/0438; B01J 2208/00132; B01J 2208/00194; B01J 2208/00212; B01J 8/0496; B01J 8/0469; B01J 2208/0053; B01J 19/0013; B01J 2219/00092; B01D 53/228; B01D 53/265; B01D 61/025; B01D 71/022; B01D 2256/16; B01D 2257/504; C02F 1/441; Y02C 10/10
  See application file for complete search history.

(56) References Cited

U.S. PATENT DOCUMENTS

2013/0011301 A1  1/2013  Edlund
2015/0122128 A1  5/2015  Edlund

FOREIGN PATENT DOCUMENTS

CN  104925755 A   9/2015
CN  204778809 U  11/2015

\* cited by examiner

RESIDUAL GAS HEAT EXCHANGE COMBUSTION-SUPPORTING SYSTEM BASED ON METHANOL-WATER MIXTURE REFORMING HYDROGEN PRODUCTION SYSTEM, AND METHOD THEREOF

CROSS-REFERENCE TO RELATED APPLICATIONS

This application is a continuation of International Patent Application No. PCT/CN2016/083485 with a filing date of May 26, 2016, designating the United States, now pending, and further claims priority to Chinese Patent Application No. 201510300749.2 with a filing date of Jun. 5, 2015. The content of the aforementioned application, including any intervening amendments thereto, are incorporated herein by reference.

TECHNICAL FIELD

The present invention relates to the technical field of hydrogen production from methanol-water mixture reforming, and particularly to residual gas heat exchange combustion-supporting system based on a methanol-water mixture reforming hydrogen production system and a method thereof.

BACKGROUND OF THE PRESENT INVENTION

Hydrogen is one of the most desirable energies of the 21st century, which produces the most energy under the circumstances that a same amount of coal, gasoline, and hydrogen is being burned. The final product from combustion of the hydrogen is water without ash and exhaust gases causing environment pollution; while $CO_2$ and $SO_2$ are primary products from combustion of coal and petroleum which respectively lead to greenhouse effect and acid rain. Coal and petroleum reserves are limited, and the hydrogen primarily exists in water, the only product from combustion is water continuing to produce hydrogen which will never be used up. Hydrogen is widely distributed, and water is a large "warehouse" of the hydrogen, which contains 11% of hydrogen. There is about 1.5% of the hydrogen in the soil; petroleum, coal, natural gas, animal and plant body and the like all contain hydrogen. Hydrogen is mainly in form of compound water, and about 70% of the Earth's surface is covered by water, water storage capacity is large, it can be said therefore that hydrogen is an "inexhaustible" energy. If hydrogen can be produced in a suitable way, then hydrogen will also be a rather cheap energy source.

At present, the world's annual output of the hydrogen is about 36 million tons, there are two primary hydrogen production methods: one of which is that the vast majority of the hydrogen is prepared from the petroleum, coal and natural, gas, and this method needs to consume originally scarce fossil fuels; the other of which is about 4% of the hydrogen is prepared by electrolysis of water, and this method consumes large power and is not economical. With the development of the technology, the technology of hydrogen production from methanol-water mixture reforming is gradually developed, which can reduce the energy consumption and reduce the cost of chemical production, and is expected to replace the water-electrolytic hydrogen production technology of which electricity consumption is particular high. Advanced methanol-steam reforming technology is used to produce a mixed gas of $H_2$ and $CO_2$, and is then separated by a palladium membrane separator to obtain $H_2$ and $CO_2$ respectively.

With reference to a Chinese application for a patent for invention 201310340475.0 (with the applicant being Shanghai Hejide Dynamic Hydrogen Machine Co., Ltd.), the invention discloses a methanol-water mixture hydrogen production system, wherein the methanol and the steam are subjected to methanol cracking reaction and carbon monoxide conversion reaction in the reforming chamber of the reformer at a temperature of 350-570° C. and a pressure of 1-5 MPa in the presence and under the effect of a catalyst to generate hydrogen and carbon dioxide, and the system is a multi-component and multi-reaction gas-solid catalytic reaction system. The reaction equations are as follows: (1) $CH_3OH \rightarrow CO+2H_2$; (2) $H_2O+CO \rightarrow CO_2+H_2$; (3) $CH_3OH+H_2O \rightarrow CO_2+3H_2$ the $H_2$ and $CO_2$ produced from the reforming reaction then separates $H_2$ and $CO_2$ by the palladium membrane separator in the separation chamber to obtain high-purity hydrogen.

During the process of hydrogen production from methanol-water mixture reforming, due to the fact that a temperature of 350-570° C. needs to be maintained in the reformer, after the reformer is started, part of the generated $H_2$ needs to be in combustion with $O_2$ to generate heat to maintain the operation of, the reformer. In the prior art, $O_2$ is directly derived from the air fanned from the outside into the reformer, specifically referring to the Chinese invention application 201410311217.4 (Applicant: Guangdong Hejide Energy Technology Co., Ltd.), the reformer is equipped with an air inlet cover plate which is provided with an air duct through which the outside air can enter the reformer. The reformer is equipped with an exhaust device (air cylinder), the $N_2$, $CO_2$ and other unburned gases in the outside air, as well as the water vapor generated from combustion of $O_2$ and $H_2$ are all discharged from the exhaust device (air cylinder) at the same time, the $H_2$ and $CO_2$ produced from the methanol-water mixture reforming reaction are separated out the hydrogen by the palladium membrane separator in the separation chamber, and the remaining $CO_2$ and the unreacted water vapor are also discharged from the exhaust device (air cylinder). These exhaust gases (including, water vapor, $CO_2$, $N_2$ and other gases) have the characteristics of being oxygen-deficient, water vapor-rich, and high-heat and the temperature thereof is usually between 300-600° C.

In view of the above, based on the above technical conditions, the defects are: firstly, the discharged residual gases have wasted a lot of heat, making the utilization ratio of the methanol-water mixture feedstock for the methanol-water mixture reforming hydrogen production system being not high, which is not conducive to energy conservation and emission reduction; secondly, the discharged residual gases have high temperature (usually 300-600° C.), which has an, impact on the operation of each component of the methanol-water mixture reforming hydrogen production system, such, as when the control device is affected by the high temperature gas, its life and stability will be significantly reduced, or even there will be serious burnout problems; thirdly, the $O_2$ required for combustion in the reformer is directly derived from the air fanned from the outside into the reformer, the air temperature is room temperature, and after the room temperature air directly enters the reformer, its combustion-supporting effect is not good.

SUMMARY OF PRESENT INVENTION

A technical problem to be solved by the present invention is to provide residual gas heat exchange combustion-supporting system based on a methanol-water mixture reforming hydrogen production system for over the deficiencies in the prior art, and the residual gas heat exchange combustion-supporting system is capable of fully reclaiming the heat of the residual gas discharged by the reformer, so that the outside air with a raised temperature has an extremely good combustion-supporting effect. The present invention also provides a method of the residual gas heat exchange combustion-supporting system.

In order to solve the above-mentioned, first technical problem, the technical solution of the invention is that:

residual gas heat exchange combustion-supporting system based on a methanol-water mixture reforming hydrogen production system, comprising a reformer, a heat exchange tube and an air intake device, wherein:

the reformer, which is provided with a reforming chamber used for producing a mixed gas of hydrogen and carbon dioxide from a reforming reaction for hydrogen production between methanol and steam, a separating device used for separating the produced hydrogen out, a combustion chamber used for combustion of part of the produced hydrogen with the oxygen in the outside air to provide heat for the operation of the reformer, and an exhaust vent; the carbon dioxide separated out by the separating device, the water vapor generated by combustion of the hydrogen and the oxygen in the combustion chamber and the unburned gas in the outside air are mixed into residual gas which will be discharged from the exhaust vent to the first delivery passage of the heat exchange tube;

the heat exchange tube, having coaxial double-layer delivery passages, i.e., first and second delivery passages, at one end of the heat exchange tube, the first delivery passage is communicated with the exhaust vent, and the second delivery passage is communicated with the air inlet of the combustion chamber of the reformer; at the other end of the heat exchange tube, the first delivery passage is provided with residual gas outlet, and the second delivery passage is connected with the air intake device; the outside air input by the air intake device in the second delivery passage exchanges heat with the residual gas in the first delivery passage, the outside air with a raised temperature enters the combustion chamber of the reformer for supporting combustion, and the residual gas with a lowered temperature is discharged from the residual gas outlet of the first delivery passage.

The residual gas heat exchange combustion-supporting system based on a methanol-water mixture reforming hydrogen production system is further provided with a gas-water separator which comprises a gas-water separator body, and a gas-water inlet, an air outlet and a water outlet provided on the gas-water separator body, wherein the gas-water inlet is communicated with the residual gas outlet of the first delivery passage, and the air outlet is connected with an exhaust fan.

The water outlet of the water-gas separator is connected with a water purifier in which an RO-membrane water purifying device is provided, and the water purified by the water purifier is output to the water purification tank.

The residual gas heat exchange combustion-supporting system based on a methanol-water mixture reforming hydrogen production system further comprises a methanol-water mixture storage and delivery device including, methanol-water mixture storage vessel and a delivery pump, the methanol-water mixture storage vessel is stored with liquid methanol and water feedstock, and the delivery pump is used for delivering the methanol and mater feedstock stored in the methanol-water mixture storage vessel to the reformer; the water output by the gas-water separator or the water output by the water purification tank is supplied to the methanol-water mixture storage vessel as a water feedstock.

A heat exchanger is provided on the delivery line between the methanol-water mixture storage and delivery device and the reformer, a low-temperature methanol and water feedstock exchanges heat with the high-temperature hydrogen output from the reforming chamber in the heat exchanger, and the methanol and water feedstock is warmed and vaporized; the hydrogen output from the gas producing end of the separating device is cooled by the heat exchanger.

The heat exchange tube is wound helically around a shell of the reformer, the upper end of the heat exchange tube is one end communicating the exhaust vent of the reformer with the air inlet of the combustion chamber of the reformer, and the lower end of the heat exchange tube is one end connecting an air intake device with residual gas outlet.

The heat exchange tube is any one of a coaxial double-layer titanium alloy corrugated pipe, a coaxial double-layer magnesium alloy corrugated pipe, a coaxial double-layer aluminum corrugated pipe, a coaxial double-layer copper corrugated pipe, and a coaxial double-layer stainless steel corrugated pipe.

In order to solve the above-mentioned second technical problem, the technical solution of the invention is that:

a method of the residual gas heat exchange combustion-supporting system based on a methanol-water mixture reforming hydrogen production system comprises the following steps:

(1) during operation of the reformer, discharging an oxygen-deficient, water vapor-containing and high-heat residual gas from the exhaust vent, which enters the first delivery passage of the heat exchange tube from one end of the heat exchange tube; and at the same time, during operation of the air intake device, bringing the outside air introduced from the air intake device into the second delivery passage of the heat exchange tube from the other end of the heat exchange tube;

(2) exchanging heat between the outside air in the second delivery passage exchanges heat and the residual gas in the first delivery passage, resulting in that the outside air is warmed to turn into a high-heat air, and enters the combustion chamber of the reformer for supporting combustion; and at the same time, the residual gas is cooled to turn into residual gas with low heat, and the water vapor in the residual gas is condensed into condensed water, both the residual gas and the condensed water being discharged from the residual gas outlet of the first delivery passage.

Both of the residual gas and the condensed water discharged by the residual gas outlet of the first delivery passage enter the gas-water separator for separation, the separated residual gas is discharged to the outside world via an exhaust fan, and the separated condensed water is used as a water feedstock for operation of the reformer.

The invention has the following advantages:

first, the invention enables a large amount of heat energy in the residual gas discharged from the reformer to be reclaimed by providing coaxial double-layer heat exchange tubes, so that the utilization rate of the methanol-water mixture feedstock of the methanol-water mixture reforming hydrogen production system is greatly improved, which is conducive to energy conservation and emission reduction;

second, the residual gas discharged from the exhaust vent of the reformer usually has a temperature of from 300 to 600° C., the residual gas exchanges heat through the heat exchange tube, and the temperature will usually be reduced below 50° C., such residual gas having a low temperature is difficult to have an impact on the operation of each component of the methanol-water mixture reforming hydrogen production system, thus, can avoid the high-temperature residual gas to reduce life and stability of the methanol-water mixture reforming hydrogen production system, as well as avoid serious equipment-burning problems;

third, the temperature of the outside air is raised immediately after it exchanges heat with the high-temperature residual gas in, the heat exchange tube, the temperature of the outside air can usually reach as high as 200-500° C., when the high-temperature air enters the combustion chamber of the reformer, not only the high-temperature air can provide part of the heat for the reforming chamber to reduce the hydrogen combustion amount, but also, the oxygen and hydrogen in the high-temperature air can be better combusted, such that the oxygen combustion effect is extremely good; and furthermore, in a further preferred embodiment of the present invention, a gas-water separator is provided by the invention, the gas-water inlet of the gas-water separator is communicated with the residual gas outlet of the heat exchange tube, and when the oxygen-deficient, water vapor-containing and high-heat residual gas exchanges heat through the heat exchange tube, the majority of water vapor is condensed into condensed water upon cooling, after this part of the condensed water is separated by the gas-water separator and is outflowed through the gas-water separator, which makes the water feedstock needed by the reaction for hydrogen production from methanol-water mixture reforming or for other purposes; in some areas where the water resources are in shortage and the methanol-water mixture reforming hydrogen production system is needed, such as alpine communication base stations, hydrogen stations and the like where the preparation of water is particularly significant.

DETAILED DESCRIPTION OF PREFERRED EMBODIMENTS

The following are further descriptions of the invention with reference to figures and examples of their applications.

Figure 1:
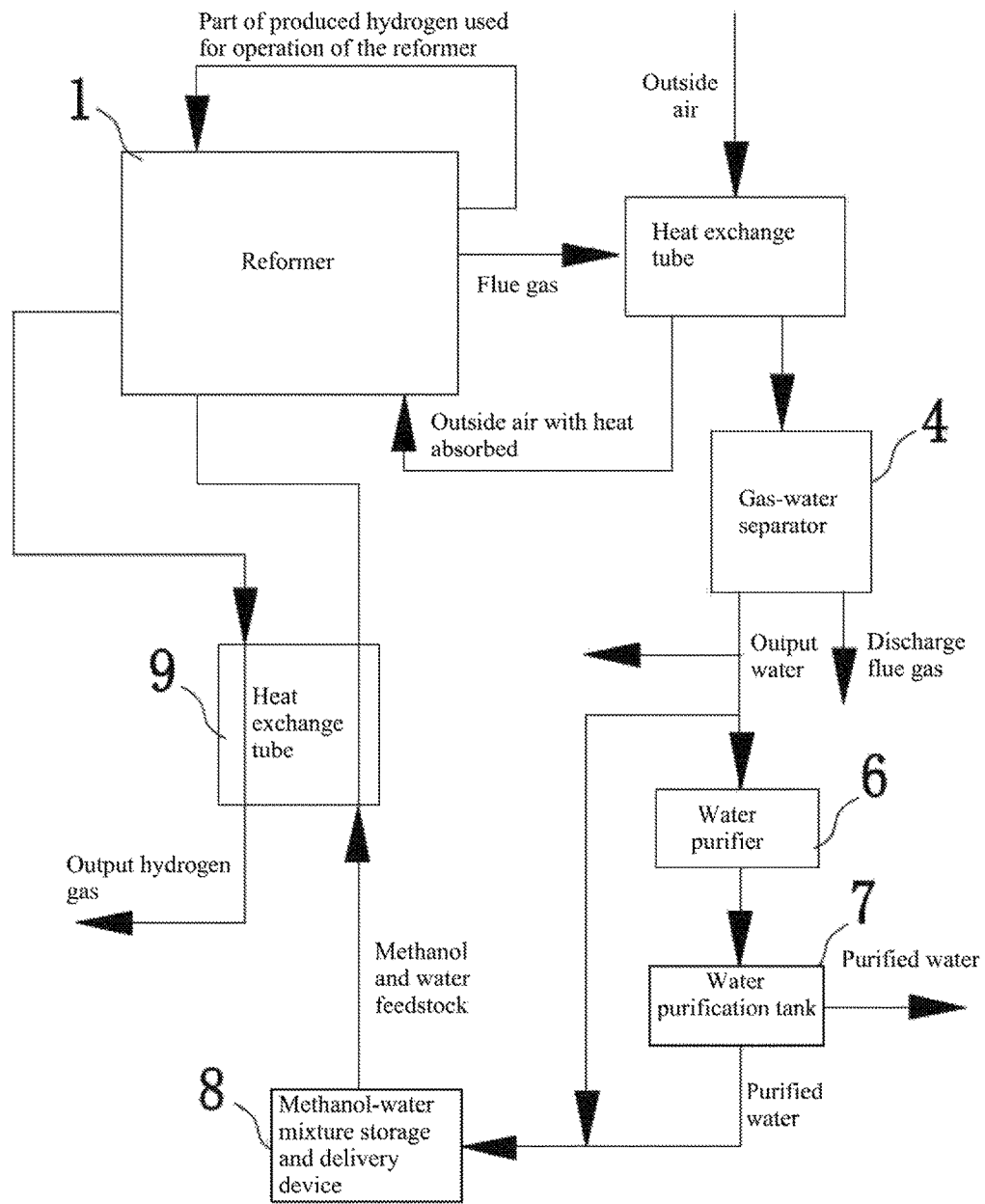
FIG. 1 is a block schematic diagram showing the overall structure of the present invention.
Figure 2:
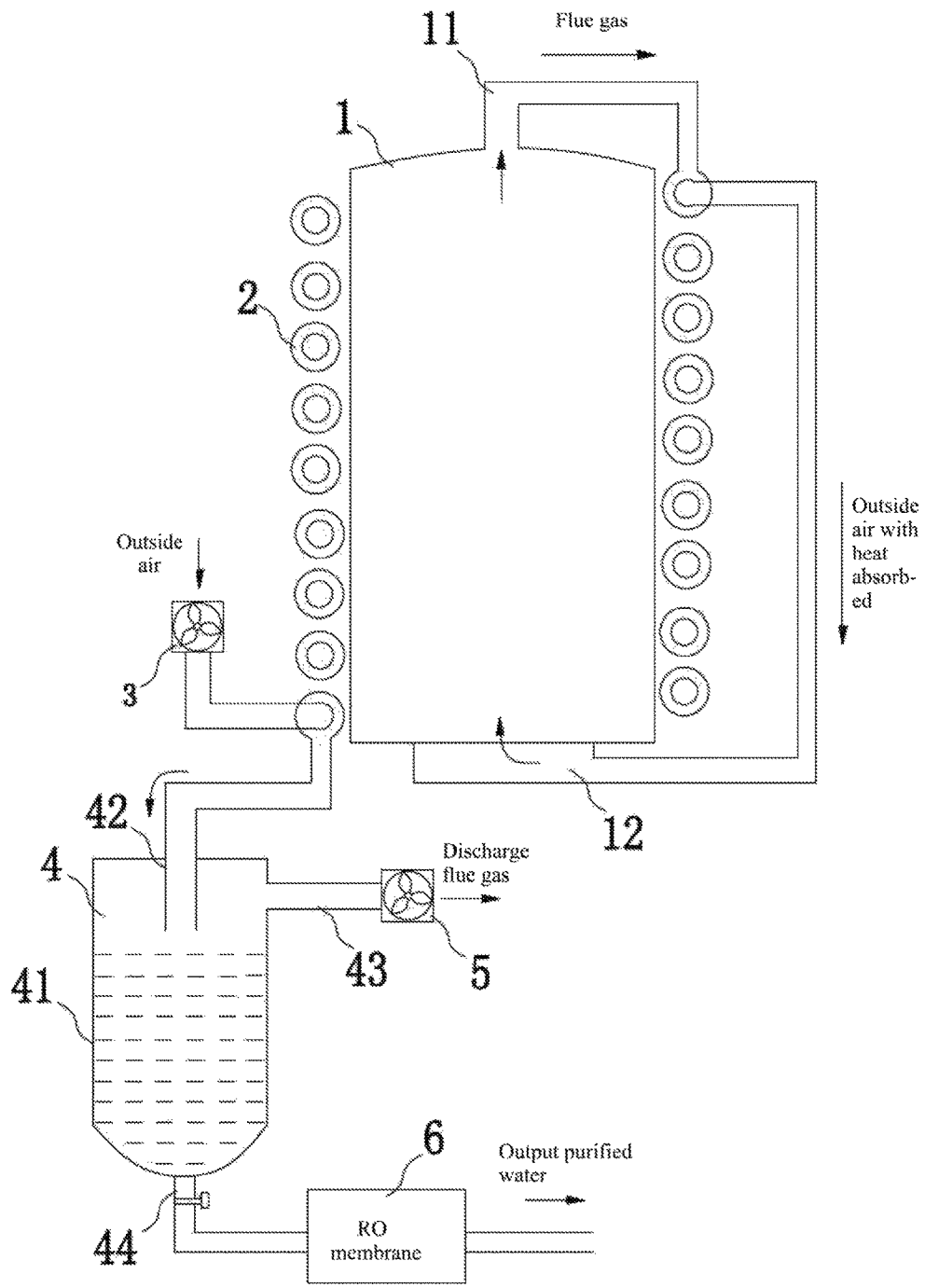
FIG. 2 is a longitudinal cross-sectional view showing the structure sketch of principal design of a preferred embodiment of the present invention.
Figure 3:
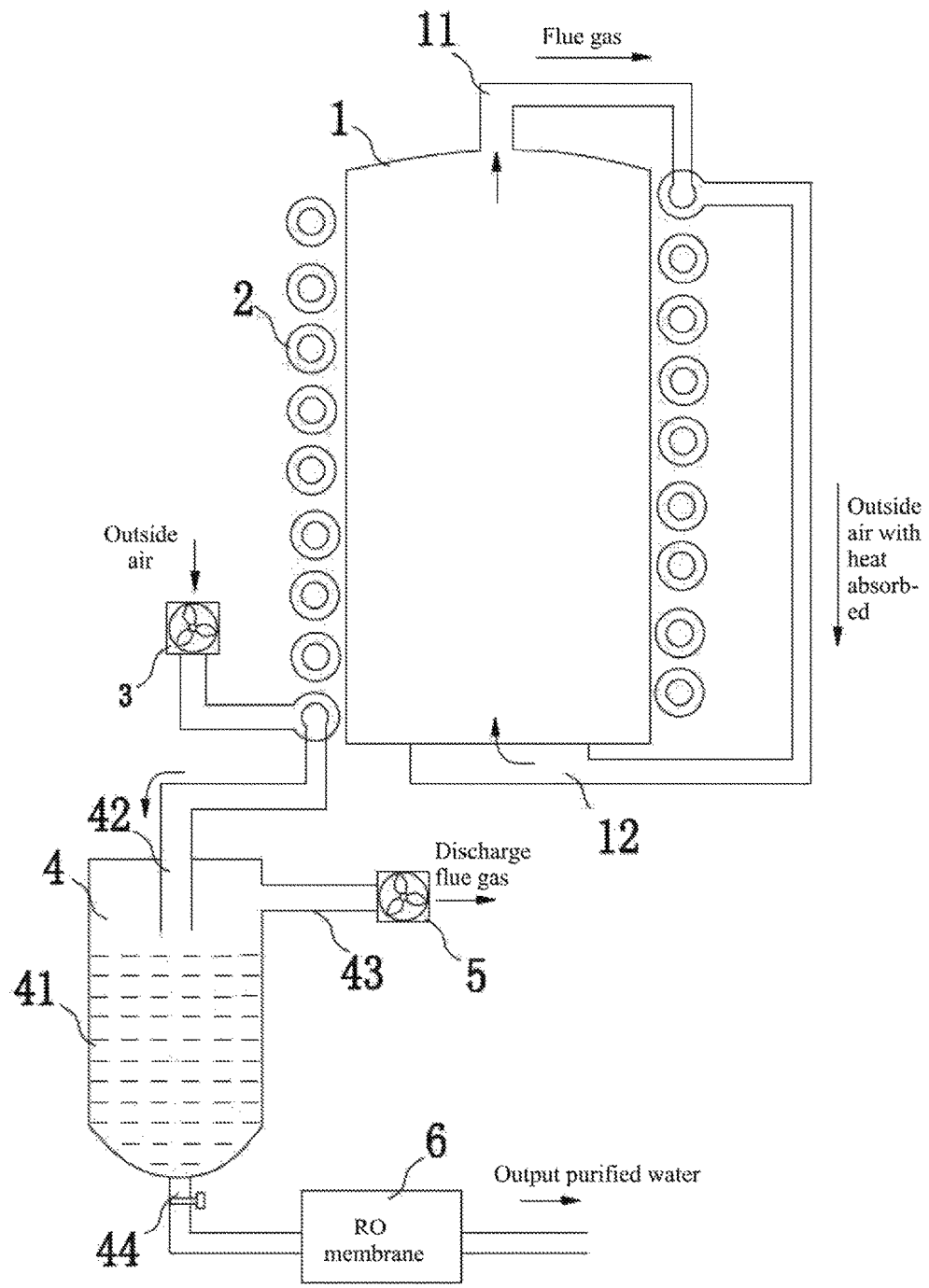
FIG. 3 is a longitudinal cross-sectional view showing the structure sketch of principal design of another preferred embodiment of the present invention.

As shown in FIGS. 1, 2 and 3, the present invention is residual gas heat exchange combustion-supporting system based on a methanol-water mixture reforming hydrogen production system. The system comprises a reformer 1, a heat exchange tube 2 and an air intake device 3. The reformer 1 is provided with a reforming chamber, a separating device, a combustion chamber and an exhaust vent 11, the reforming chamber is used for producing a mixed gas of hydrogen and carbon dioxide from a reforming reaction for hydrogen production between methanol and steam, the temperature of the reforming chamber is 300-570° C., and the reforming chamber is provided with a catalyst, in the reforming chamber, the methanol and the steam are subjected to methanol cracking reaction and carbon monoxide conversion reaction in the reforming chamber at a temperature of 50-570° C. and pressure of 1-5 MPa in the presence of a catalyst to generate hydrogen and carbon dioxide, and the system is a multi-component and multi-reaction gas-solid catalytic reaction system, the reaction equations are as follows: (1) $CH_3OH \rightarrow CO+2H_2$, (2) $H_2O+CO \rightarrow CO_2+H_2$, (3) $CH_3OH+H_2O \rightarrow CO_2+3H_2$, the $H_2$ and $CO_2$ produced from the reforming reaction; the separating device is used for separating the produced hydrogen. The separating device is preferably a membrane separating device which is a membrane separating device prepared by vacuum-plating palladium-silver alloy on the surface of the porous ceramics, the coating layer is a palladium-silver alloy, palladium accounts for 75%-78% of the mass percent of the palladium-silver alloys, and silver accounts for 22%-25% of the palladium-silver alloys, and the temperature in the separating device is the same as or close to that in the reforming chamber; the combustion chamber is used for the combustion of the partially prepared hydrogen and the oxygen in the outside air to provide heat for the operation of the reformer; the carbon dioxide separated out by the separating device, the water vapor generated by combustion of the hydrogen and the oxygen in the combustion chamber and the unburned gas in the outside air are mixed into residual gas which is discharged from the exhaust vent 11 to the first delivery passage of the heat exchange tube 2;

the heat exchange tube 2, having coaxial double-layer first and second delivery passage, and the first delivery passage is communicated with the exhaust vent 11 at one end of the heat exchange tube 2, while the second delivery passage is communicated with the air inlet 12 of the combustion chamber of the reformer; at the other end of the heat exchange tube 2, the first delivery passage is provided with residual gas outlet, and the second delivery passage is connected with, the air intake device 3; the outside air input by the air intake device 3 in the second delivery passage exchanges heat with the residual gas in the first delivery passage, the outside air with a raised temperature enters the combustion chamber of the reformer for supporting combustion, and the residual gas with a lowered temperature is discharged from the residual gas outlet of the first delivery passage.

Figure 4:
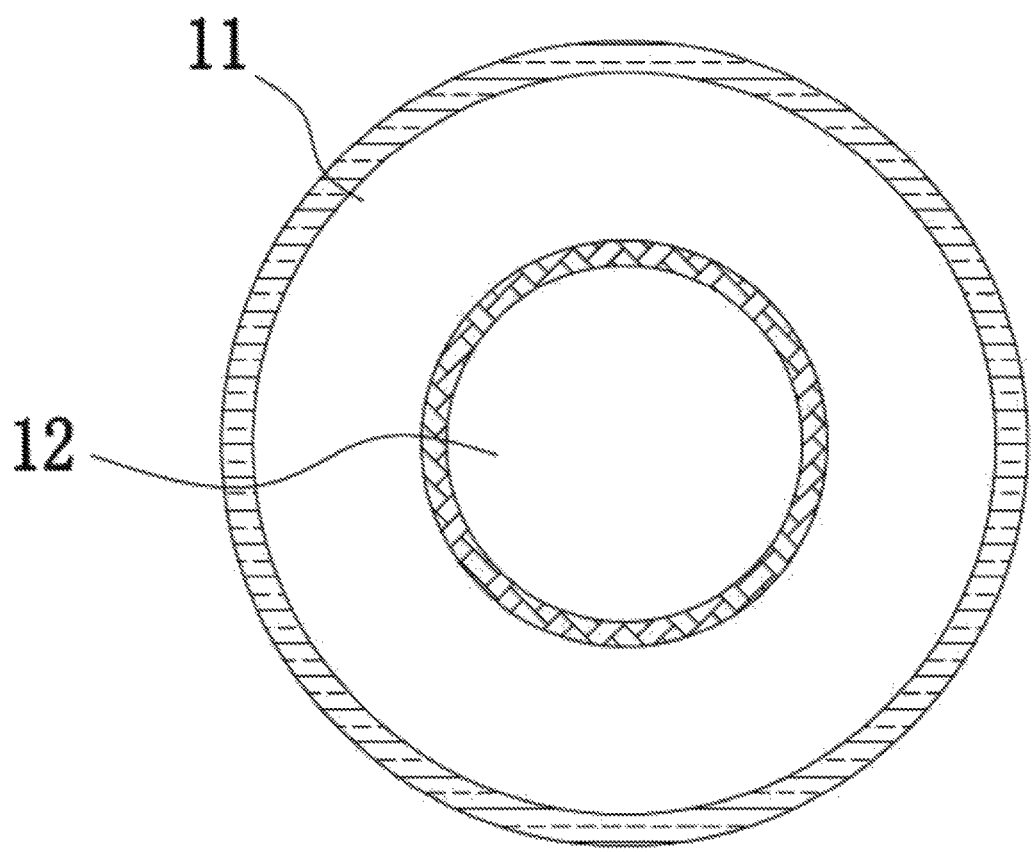
FIG. 4 is a schematic cross-sectional structure view of a heat exchange tube.

One should also note that, with reference to FIG. 4, the present invention adopts the names of the first transport delivery passage and the second delivery passage, and does not use to restrict the name of the outer-layer passage 11 and the inner-layer passage 12 of the heat exchange tube, but is used for distinguishing the outer-layer passage 11 and the inner-layer passage 12 of the heat exchange tube. In FIG. 2, the first delivery passage refers to the outer-layer passage 11 of the heat exchange tube, while the second delivery passage refers to the inner-layer passage 12 of the heat exchange tube; in FIG. 3, the first delivery passage refers to the inner-layer passage 12 of the heat exchange tube, while the second delivery passage refers to the outer-layer passage 11 of the heat exchange tube. As can be seen from the introduction, when the residual gas is delivered by the outer-layer passage 11 of the heat exchange tube, while the outside air is delivered by the inner-layer passage 12 of the heat exchange tube; when the residual gas is delivered by the inner-layer passage 12 of the heat exchange tube, while the outside air is delivered by the outer-layer passage 11 of the heat exchange tube.

As shown in FIGS. 1, 2 and 3, the residual gas heat exchange combustion-supporting system based on a methanol-water mixture reforming hydrogen production system is further provided with a gas-water separator 4 which comprises a gas-water separator body 41, and a gas-water inlet 42, an air outlet 43 and a water outlet 44 provided on the gas-water separator body, wherein the gas-water inlet 42 is communicated with the residual gas outlet of the first delivery passage, and the air outlet 43 is connected with the exhaust fan 5.

As shown in FIGS. 1, 2 and 3, the water outlet 44 of the water-gas separator 4 is connected with a water purifier 6 in which an RO-membrane water purifying device is provided, and the water purified by the water purifier 6 is output to the water purification tank 7.

As shown in FIG. 1, the residual gas heat exchange combustion-supporting system based on a methanol-water mixture reforming hydrogen production system further comprises a methanol-water mixture storage and delivery device 8 including a methanol-water mixture storage vessel and a delivery pump, the methanol-water mixture storage vessel is stored with liquid methanol and water feedstock, and the delivery pump is used for delivering the methanol and water feedstock stored in the methanol-water mixture storage vessel to the reformer 1; the water output by the gas-water separator 4 or the water output by the water purification tank 7 is supplied to the methanol-water mixture storage vessel as a water feedstock, and the remaining water can be used for other purposes.

As shown in FIG. 1, a heat exchanger 9 is provided on the delivery line between the methanol-water mixture storage and delivery device 8 and the reformer 1, a low-temperature methanol and water feedstock exchanges heat with the high-temperature hydrogen output from the reforming chamber in the heat exchanger 9, and the methanol and water feedstock is warmed and vaporized; the hydrogen output from the gas producing end of the separating device is cooled by the heat exchanger 9. As shown in FIGS. 2 and 3, the heat exchange tube 2 is wound helically around a shell of the reformer 1, which can not only save the space volume occupied by the heat exchange tube 2, but also can fully lengthen the heat exchange tube 2. The upper end of the heat exchange tube 2 is one end communicating the exhaust vent 11 of the reformer with the air inlet 12 of the combustion chamber of the reformer, and the lower end of the heat exchange tube 2 is one end connecting an air intake device 3 with residual gas outlet, which is conducive to rapidly lowering temperature of the high-temperature residual gas upon cooling, and rapidly raising the temperature of the outside air upon heat.

In the above-mentioned technical solution, the heat exchange tube is any one of a coaxial double-layer titanium alloy corrugated pipe, a coaxial double-layer magnesium alloy corrugated pipe, a coaxial double-layer aluminum corrugated pipe, a coaxial double-layer copper corrugated pipe, and a coaxial double-layer stainless steel corrugated pipe, which has an extremely good rigidity performance.

The above method of the residual gas, heat exchange combustion-supporting system based on a methanol-water mixture reforming hydrogen production system comprises the following steps:

(1) during the operation of the reformer, an oxygen-deficient, water vapor-containing and high-heat residual gas is discharged from the exhaust vent, and the residual gas enters the first delivery passage of the heat exchange tube from one end of the heat exchange tube; at the same time, the air intake device is operating and the outside air from the air intake device enters the second delivery passage of the heat exchange tube from the other end of the heat exchange tube;

(2) the outside air in the second delivery passage exchanges heat with the residual gas in the first delivery passage, the outside air is warmed to turn into a high-heat air, and enters the combustion chamber of the reformer for supporting combustion; at the same time, the residual gas is cooled to turn into residual gas of low heat, and the water vapor in the residual gas is condensed into condensed water which is all discharged from the residual gas outlet of the first delivery passage.

Further, the residual gas and the condensed water discharged by the residual gas outlet of the first delivery passage both enter the gas-water separator, the residual gas is discharged to the outside world via an exhaust fan, and the condensed water is used as a water feedstock for operation of the reformer.

The above-described embodiments of, the invention are only the preferred embodiments of the present invention, which may be modified or varied within the scope of the claims and their equivalents, and the invention may be practiced otherwise than as specifically described.

I claim:

1. A residual gas heat exchange and combustion-supporting system based on a methanol-water mixture reforming hydrogen production system, characterized by comprising:
a reformer, a heat exchange tube and an air intake device:
wherein the reformer is provided with a reforming chamber, a separating device, a combustion chamber and an exhaust vent; the reforming chamber is configured to produce a mixed gas of hydrogen and carbon dioxide from a reforming reaction for producing hydrogen between methanol and steam; the separating device is configured to separate the produced hydrogen out; the combustion chamber is configured to burn part of the produced hydrogen with the oxygen in the outside air to provide heat for the operation of the reformer, the carbon dioxide separated out by the separating device, the water vapor generated by combustion of the hydrogen and the oxygen in the combustion chamber and the unburned gas in the outside air are mixed into residual gas; the residual gas is discharged from the exhaust vent to the first delivery passage of the heat exchange tube; and wherein the heat exchange tube is provided with a coaxial double-layer first delivery passage and a second delivery passage; at one end of the heat exchange tube, the first delivery passage is communicated with the exhaust vent, and the second delivery passage is communicated with an air inlet of the combustion chamber of the reformer; at the other end of the heat exchange tube, the first delivery passage is provided with a residual gas outlet, and the second delivery passage is connected with an air intake device; the outside air input by the air intake device is configured to exchange heat with the residual gas from the first delivery passage inside the second delivery passage; resulting in warmed outside air entering into the combustion chamber of the reformer for supporting combustion, and cooled residual gas discharging from the residual gas outlet of the first delivery passage.

2. The residual gas heat exchange combustion-supporting system based on a methanol-water mixture reforming hydrogen production system according to claim 1, characterized by further comprising a gas-water separator; wherein the gas-water separator comprises a gas-water separator body and a gas-water inlet, an air outlet and a water outlet provided on the gas-water separator body; the gas-water inlet is communicated with the residual gas outlet of the first delivery passage; and the air outlet is connected with an exhaust fan.

3. The residual gas heat exchange combustion-supporting system based on a methanol-water mixture reforming hydrogen production system according to claim 2, characterized by further comprising a methanol-water mixture storage and delivery device; the methanol-water mixture storage and delivery device comprises a methanol-water mixture storage vessel and a delivery pump; the methanol-water mixture storage vessel is configured to store liquid methanol and water feedstock and the delivery pump is configured to deliver the methanol and water feedstock stored in the methanol-water mixture storage vessel to the reformer; and the water output by the gas-water separator is supplied to the methanol-water mixture storage vessel as a water feedstock.

4. The residual gas heat exchange combustion-supporting system based on a methanol-water mixture reforming hydrogen production system according to claim 2, characterized in that the water outlet of the water-gas separator is connected with a water purifier; an RO-membrane water purifying device is provided in the water purifier, and water purified through the water purifier is outputted to a water purification tank.

5. The residual gas heat exchange combustion-supporting system based on a methanol-water mixture reforming hydrogen production system according to claim 4, characterized by further comprising a methanol-water mixture storage and delivery device, wherein the methanol-water mixture storage and delivery device comprises a methanol-water mixture storage vessel and a delivery pump; the methanol-water mixture storage vessel is configured to store liquid methanol and water feedstock and the delivery pump is configured to deliver the methanol and water feedstock stored in the methanol-water mixture storage vessel to the reformer; and the water outputted from the water purification tank is supplied to the methanol-water mixture storage vessel as a water feedstock.

6. The residual gas heat exchange combustion-supporting system based on a methanol-water mixture reforming hydrogen production system according to claim 3, characterized in that a heat exchanger is provided on the delivery line between the methanol-water mixture storage and delivery device and the reformer; the, methanol and water feedstock, at a low temperature exchanges heat with the hydrogen at a high temperature output from the reforming chamber in the heat exchanger; the methanol and water feedstock is, warmed and vaporized; the hydrogen output from a gas producing end of the separating device is cooled after passing through the heat exchanger.

7. The residual, gas heat exchange combustion-supporting system based on a methanol-water mixture reforming hydrogen production system according to claim 1, characterized in that the heat exchange tube is wound helically around a shell of the reformer, the upper end of the beat exchange tube is the end communicated with the exhaust vent of the reformer and the air inlet of the combustion chamber of the reformer, and the lower end of the heat exchange tube is the end connecting the air intake device and the residual gas outlet.

8. The residual gas heat exchange combustion-supporting system based on a methanol-water mixture reforming hydrogen production system according to claim 1, characterized in that, the heat exchange tube is any one of a coaxial double-layer titanium alloy corrugated pipe, a coaxial double-layer magnesium alloy corrugated pipe, a coaxial double-layer aluminum corrugated pipe, a coaxial double-layer copper corrugated pipe, and a coaxial double-layer stainless steel corrugated pipe.

9. A method of the residual gas heat exchange combustion-supporting system based on a methanol-water mixture reforming hydrogen production system according to claim 1, characterized by comprising the following steps:
(1) during operation of a reformer, discharging an oxygen-deficient, water vapor-containing and high-heat residual gas from the exhaust vent; the residual gas enters into a first delivery passage of a heat exchange tube from one end of the heat exchange tube; and meanwhile, during operation of an air intake device, bringing outside air introduced from an air intake device into a second delivery passage of the, heat exchange tube from the other end of the heat exchange tube; and
(2) exchanging heat between the outside air in the second delivery passage and the residual gas in the first delivery passage, resulting in that the outside air is warmed and, turns into a high-heat air, and enters the combustion chamber of the reformer for supporting combustion; and meanwhile, the residual gas is cooled and turns into residual gas with low heat, and the water vapor in the residual gas is condensed into condensed water, both the residual gas and the condensed water being discharged from the residual gas outlet of the first delivery passage.

10. The method of the residual gas heat exchange combustion-supporting system based on a methanol-water mixture reforming hydrogen production system according to claim 9, characterized in that both of the residual gas and the condensed water discharged by the residual gas outlet of the first delivery passage enter the gas-water separator for separation, the separated residual gas is discharged to the outside through an exhaust fan, and the separated condensed water is used as a water feedstock for operation of the reformer.

11. The residual gas heat exchange combustion-supporting system based on a methanol-water mixture reforming hydrogen production system according to claim 5, characterized in that a heat exchanger is provided on the delivery line between the methanol-water mixture storage and delivery device and the reformer the methanol and water feedstock at a low temperature exchanges heat with the hydrogen at a high temperature output from the reforming chamber in the heat exchanger; the methanol and water feedstock is armed and vaporized; the hydrogen output from a gas producing end of the separating device is cooled after passing through the heat exchanger.

12. The residual gas heat exchange combustion-supporting system based on a methanol-water mixture reforming hydrogen production system according to claim 2, characterized in that the heat exchange tube is wound helically around a shell of the reformer, the upper and of the beat exchange tube is the end communicated with the exhaust vent of the reformer and the air inlet of the combustion chamber of the reformer, and the lower end of the heat exchange tube is the end connecting the air intake device and the residual gas outlet.

13. The residual gas heat exchange combustion-supporting system based on a methanol-water mixture reforming hydrogen production system according to claim 3, characterized in that the heat exchange tube is wound helically around a shell of the reformer, the upper end of the heat exchange tube is the end communicated with the exhaust vent of the reformer and the air inlet of the combustion chamber of the reformer, and the lower end of the heat exchange tube is the end connecting the air intake device and the residual gas outlet.

14. The residual gas heat exchange combustion-supporting system based on a methanol-water mixture reforming hydrogen production system according to claim 4, characterized in that the heat exchange tube is wound helically around, a shell of the reformer, the upper end of the heat exchange tube is the end communicated with the exhaust vent of the reformer and the air inlet of the combustion chamber of the reformer, and the lower end of the heat exchange tube is the end connecting the air intake device and the residual gas outlet.

15. The residual gas heat exchange combustion-supporting system based on a methanol-water mixture reforming hydrogen production system according to claim 5, characterized in that the heat exchange tube is wound helically around a shell of the reformer, the upper end of the heat exchange tube is the end communicated with the exhaust vent of the reformer and the air inlet of the combustion chamber of the reformer, and the lower end of the heat exchange tube is the end connecting the air intake device and the residual gas outlet.

\* \* \* \* \*